United States Patent
Abraham et al.

(10) Patent No.: US 11,155,765 B2
(45) Date of Patent: *Oct. 26, 2021

(54) NITROGEN-FREE PHOSPHORUS COMPOUNDS AND LUBRICANTS CONTAINING THE SAME

(71) Applicant: The Lubrizol Corporation, Wickliffe, OH (US)

(72) Inventors: William D. Abraham, Concord Township, OH (US); Mahmud M. Hussain, Ann Arbor, MI (US); Kurt F. Wollenberg, Chardon, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,625

(22) Filed: Oct. 22, 2020

(65) Prior Publication Data

US 2021/0040412 A1 Feb. 11, 2021

Related U.S. Application Data

(63) Continuation of application No. 16/301,853, filed as application No. PCT/US2017/033065 on May 17, 2017, now Pat. No. 10,829,713.

(60) Provisional application No. 62/338,753, filed on May 19, 2016.

(51) Int. Cl.
| C10M 137/10 | (2006.01) |
| C07F 9/165 | (2006.01) |
| C10N 10/04 | (2006.01) |
| C10N 30/06 | (2006.01) |
| C10N 40/04 | (2006.01) |
| C10N 40/06 | (2006.01) |
| C10N 40/08 | (2006.01) |
| C10N 40/20 | (2006.01) |
| C10N 40/25 | (2006.01) |
| C10N 60/14 | (2006.01) |

(52) U.S. Cl.
CPC ....... *C10M 137/105* (2013.01); *C07F 9/1651* (2013.01); *C10M 2203/1006* (2013.01); *C10M 2207/12* (2013.01); *C10M 2207/283* (2013.01); *C10M 2207/289* (2013.01); *C10M 2215/02* (2013.01); *C10M 2215/12* (2013.01); *C10M 2215/28* (2013.01); *C10M 2219/046* (2013.01); *C10M 2223/049* (2013.01); *C10N 2010/04* (2013.01); *C10N 2030/06* (2013.01); *C10N 2040/04* (2013.01); *C10N 2040/042* (2020.05); *C10N 2040/044* (2020.05); *C10N 2040/045* (2020.05); *C10N 2040/046* (2020.05); *C10N 2040/06* (2013.01); *C10N 2040/08* (2013.01); *C10N 2040/20* (2013.01); *C10N 2040/25* (2013.01); *C10N 2040/253* (2020.05); *C10N 2060/14* (2013.01)

(58) Field of Classification Search
CPC .............. C07F 9/1651; C10N 2030/06; C10N 2040/25; C10N 2040/04; C10M 2219/046; C10M 2207/283; C10M 2215/28; C10M 2203/1006; C10M 2215/02; C10M 2223/049; C10M 2215/12; C10M 2207/12; C10M 2207/289
See application file for complete search history.

(56) References Cited

U.S. PATENT DOCUMENTS

| 5,354,485 A * | 10/1994 | Tipton | ................. C10M 135/06 508/186 |
| 2003/0153469 A1 | 8/2003 | Ozbalik | |
| 2016/0102266 A1 | 4/2016 | Edwards | |

FOREIGN PATENT DOCUMENTS

EP 2957624 A1 12/2015

* cited by examiner

*Primary Examiner* — Vishal V Vasisth
(74) *Attorney, Agent, or Firm* — Michael Miller; David Shold

(57) ABSTRACT

A composition obtained by reacting an O,O'-dialkyldithiophosphoric acid with a hydroxyalkyl acrylate or a hydroxyalkyl methacrylate, and reacting the product thereof with a dialkylphosphite provides good antiwear protection.

11 Claims, No Drawings

NITROGEN-FREE PHOSPHORUS COMPOUNDS AND LUBRICANTS CONTAINING THE SAME

CROSS REFERENCE TO RELATED APPLICATION

This application is a continuation application of application Ser. No. 16/301,853 now U.S. Pat. No. 10,829,713 filed on Nov. 15, 2018, which claims priority from PCT Application Serial No. PCT/US2017/033065 filed on May 17, 2017, and which claims benefit of Provisional Application Ser. No. 62/338,753 filed on May 19, 2016.

BACKGROUND

The disclosed technology relates to nitrogen-free phosphorus compounds which may impart anti-wear performance to lubricants.

U.S. Pat. No. 3,197,405, Le Suer, Jul. 27, 1965, discloses phosphorus- and nitrogen-containing compositions. The compositions may be prepared by reacting a hydroxyl-substituted triester of a phosphorothioic acid with an inorganic phosphorus agent, and neutralizing with an amine. The product may be used in a gear lubricant.

United States Patent Application Publication 2003/0153469, Ozbalik, Aug. 14, 2003, discloses a power transmission lubricating composition containing a base oil, a dispersant, and a lubricant additive produced by the reaction of a dihydrocarbyldithio-phosphoric acid and a hydrocarbyl acrylate. The reaction product may be depicted as

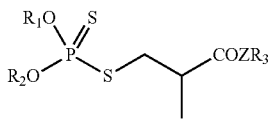

wherein Z is oxygen or nitrogen. Suitable reactants include a $C_6$ to $C_{20}$ hydrocarbyl acrylate and di-isopropyl/methyl-isobutylcarbonol mixed dithiophosphoric acid, di-2ethylhexyl dithiophosphoric acid, or di-isodecyl dithiophosphoric acid.

PCT Publication WO 2012/030594, Lubrizol, Mar. 8, 2012 discloses a composition comprising an alkyl primary amine salt or an alkyl secondary amine salt of a phosphorus-containing composition which comprises at least some molecules represented by the formulas

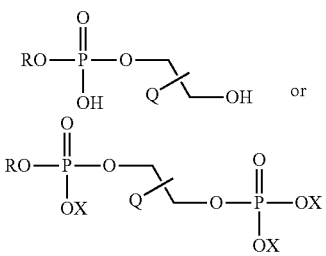

where R is an alkyl group having about 4 to about 20 carbon atoms, each Q is independently hydrogen or an alkyl group of 1 to about 6 carbon atoms, and each X is independently R, or H, or a —R'OH group where R' is an alkylene group of 2 to 6 carbon atoms, provided that at least one X is H. The technology relates to an antiwear agent and lubricating compositions thereof.

PCT Publication WO 2008/094759, Lubrizol, Aug. 7, 2008, discloses a lubricating composition containing a sulfur-free amine salt of either (i) a hydroxyl-substituted diester of phosphoric acid, or (ii) a phosphorylated hydroxy-substituted di- or triester of phosphoric acid. The salt of a hydroxy-substituted diester of phosphoric acid may be prepared by reacting a phosphorylating agent with an alcohol, to form a mono- and/or diphosphate ester; reacting the phosphate ester with an alkylene oxide, to form a hydroxy-substituted diester of phosphoric acid; and salting the hydroxy-substituted diester of phosphoric acid with an amine and/or metal.

U.S. Pat. No. 6,627,584, Ozbalik, Sep. 30, 2003, discloses an automatic transmission fluid additive comprising a reaction product of hydrocarbyl acrylates and dihydrocarbyldithiophosphoric acids. Among the materials listed as hydrocarbyl acrylates is tris(acryloyloxyethyl) phosphate.

SUMMARY

The disclosed technology provides a composition comprising a material represented by the formula

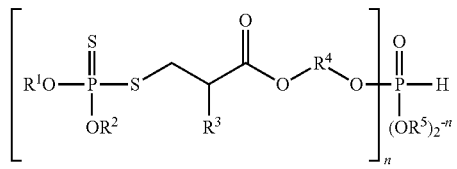

wherein $R^1$ and $R^2$ are each independently hydrocarbyl groups of 3 to about 12 carbon atoms, or 6 to 8 carbon atoms, or are groups represented by

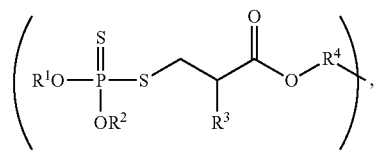

or wherein $R^1$ and $R^2$ together with the adjacent O and P atoms form a ring containing 2 to 6 carbon atoms; $R^3$ is hydrogen or a methyl group, $R^4$ is an alkylene group of 2 to 6 carbon atoms, $R^5$ is hydrogen or a hydrocarbyl group of 1 to about 12 carbon atoms, and n is 1 or 2.

The disclosed technology further provides a composition obtained or obtainable by reacting (a) an O,O'-dialkyldithiophosphoric acid with (b) a hydroxyalkyl acrylate or a hydroxyalkyl methacrylate, and reacting the product thereof with (c) a dialkylphosphite.

The disclosed technology further provides a lubricant comprising an oil of lubricating viscosity and the foregoing composition.

The disclosed technology provides a lubricant additive which provides one or more of improved antiwear performance, anti-corrosion performance, water tolerance, extreme pressure performance, deposit control, and oxidation stability, while being free of or having a reduced amount of long-chain amine compounds which may be of toxicity concern.

DETAILED DESCRIPTION

Various preferred features and embodiments will be described below by way of non-limiting illustration.

The disclosed technology provides a composition (which is to say, a composition, a compound, or a mixture of compounds) comprising a material, or containing at least one material possibly mixed with other materials, represented by the formula

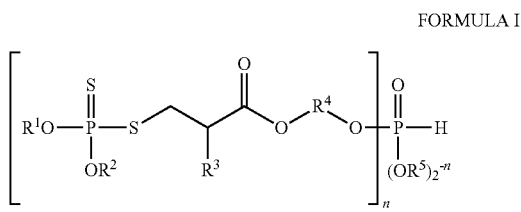

FORMULA I wherein $R^1$ and $R^2$ are each independently hydrocarbyl groups of 3 to 12 carbon atoms, or 6 to 8 carbon atoms, or are groups represented by

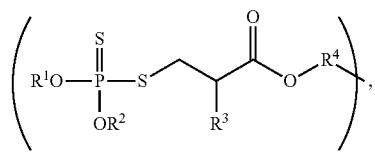

or wherein $R^1$ and $R^2$ together with the adjacent O and P atoms form a ring containing 2 to 6 carbon atoms; $R^3$ is hydrogen or a methyl group, $R^4$ is an alkylene group of 2 to 6 carbon atoms, $R^5$ is hydrogen or a hydrocarbyl group of 1 to about 12 carbon atoms, and n is 1 or 2. The material represented by the above formula is typically a neutral compound (or mixture of compounds) as the hydrogen atom shown attached to the phosphorus is not considered to be particularly acidic.

The materials of the disclosed technology, in certain embodiments, may nominally be represented by Formula I, without specifying any materials where $R^1$ or $R^2$ are $(R^1O)(R^2O)P(S)SC_2H_3R^3COOR^4$—, that is, not as dimeric or oligomeric species. That is, $R^1$ and $R^2$ may nominally be the aforementioned hydrocarbyl or cyclic groups. In actual practice, however, the materials may tend to be more complicated mixtures of various structures. For instance, it is believed that the intermediate of the formula $(R^1O)(R^2O)P(S)SC_2H_3R^3COOR^4OH$, described in greater detail below, may react not only with the target phosphite (e.g., dimethylphosphite), to give Formula I, but it may alternatively react with an $R^1O$— or $R^2O$— alkoxy group of a $(R^1O)(R^2O)P(S)SC_2H_3R^3COOR^4$— moiety, thereby forming a dimeric moiety $((R^1O)(R^2O)P(S)SC_2H_3R^3COOR^4$—O)$(R^2O)P(S)SC_2H_3R^3COOR^4$— or even an oligomeric moiety. Eventually, of course, any polymerization or oligomerization would be terminated in a structure wherein $R^1$ and $R^2$ are both hydrocarbyl or alkyl groups. In certain embodiments, the amount of dimeric, oligomeric, or higher species may represent 0 to 80 weight percent, or 0 to 50, or 1 to 30, or 2 to 20, or 3 to 15 weight percent of the phosphorus-and-sulfur-containing species. In a similar manner, reactive short chain alkyl groups such as methyl groups such as derived from methanol may be present in a reaction mixture, originating, for instance, from a dimethylphosphite reactant. Therefore, a portion of the alkoxy groups on the dithiophosphate moieties may be short chain groups such as methoxy groups, even though nominally $R^1$ and $R^2$ would be hydrocarbyl groups of 3 to 12 carbon atoms. The presence of such materials may be considered to be byproducts that do not affect the fact that the disclosed material is represented by Formula I.

In certain embodiments the material of the composition may be represented by the formula

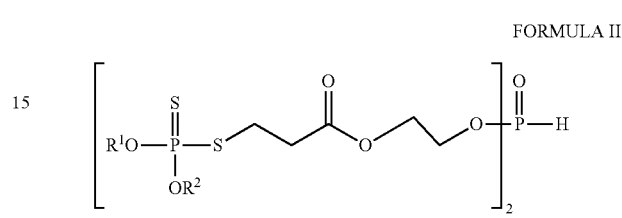

FORMULA II that is, Formula I in which $R^3$ is hydrogen, $R^4$ is an ethylene group, and n is 2. As in the case of Formula I, one or both of the $R^1$ or $R^2$ groups may groups represented by

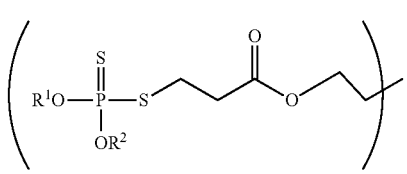

In either Formula I or Formula II, in certain embodiments $R^1$ and $R^2$ may each independently be $C_6$ or $C_8$ alkyl groups, or mixtures thereof, such as 2-ethylhexyl groups or 4-methyl-2-pentyl groups or mixtures thereof.

As used in this specification, the term "hydrocarbyl substituent" or "hydrocarbyl group" is used in its ordinary sense, which is well-known to those skilled in the art. Specifically, it refers to a group having a carbon atom directly attached to the remainder of the molecule (in the case of an alcohol, directly attached to the —OH group of the alcohol) and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group.

The composition of the disclosed technology, as represented by Formula I or Formula II, may be obtained or is obtainable by reacting an O,O'-dialkyldithio-phosphoric acid with a hydroxyalkyl acrylate or a hydroxylalkyl methacrylate, and reacting the product thereof with a dialkylphosphite.

The O,O'-dialkyldithiophosphoric acid may be represented by

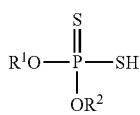

where $R^1$ and $R^2$ are as defined above. This material may be prepared by reacting the desired alcohol or alcohols $R^1OH$ and/or $R^2OH$ with phosphorus pentasulfide under known conditions. The alcohols may thus be alcohols of 3 to 12 carbon atoms, such as propanol, isopropanol, n-butanol, isobutanol, tert-butanol, n-pentanol and various isomers of pentanol such as isopentyl alcohol, n-hexanol and various isomers of hexanol such as 4-methyl-2-pentanol, n-heptanol and isomers thereof, n-octanol and various isomers of octanol such as isooctyl alcohol or 2-ethylhexanol, various isomers of nonyl alcohol, various isomers of decyl alcohol, various isomers of undecyl alcohol, and various isomers of dodecyl alcohol. In certain embodiments 4-methyl-2-pentanol or 2-ethylhexanol or mixtures thereof may be used, leading to $R^1$ and $R^2$ being 4-methyl-2-pentyl groups or 2-ethylhexyl groups or mixtures thereof. In one embodiment $R^1$ and $R^2$ are both 4-methyl-2-pentyl groups. In another embodiment $R^1$ and $R^2$ are both 2-ethylhexyl groups. In one embodiment the $R^1$ and $R^2$ groups are groups derived from a mixture of isobutyl alcohol and amyl alcohols. In one embodiment they are derived from a mixture of 2-ethylhexanol and 4-methyl-2-pentanol. Such mixtures may be obtained by reacting phosphorus pentasulfide with mixtures of the alcohols, leading to an approximately statistical mixture in the R groups. Mixtures may also be obtained by reacting phosphorus pentasulfide with single alcohols and then mixing the resulting dialkyldithiophosphoric acids.

The O,O'-dialkyldithiophosphoric acid may also be a species in which $R^1$ and $R^2$ together with the adjacent O and P atoms form a ring containing 2 to 6 carbon atoms. Such a structure, in the case of a ring containing 2 carbons, might be termed 2-mercapto-1,3,2-dioxaphospholane-2-sulfide or a substituted homologue thereof, but for the sake of simplicity they will be considered within the nomenclature of the dialkyldithiophosphoric acids. Such materials may be prepared by reaction of phosphorus pentoxide with diols such as 1,2-diols or 1,3-diols, the simples of which are ethylene glycol and 1,3-propylene glycol, but may contain additional carbon atoms, chains, or rings. The reaction with the diols may give a mixture of cyclic structures and linear structures.

The dialkyldithiophosphate thus prepared will be reacted with a hydroxyalkyl acrylate or a hydroxyalkyl methacrylate. The S—H functionality of the dialkyldithiophosphate will add to the ethylenic double bond of the (meth)acrylate structure to form an intermediate by a reaction represented by the following scheme:

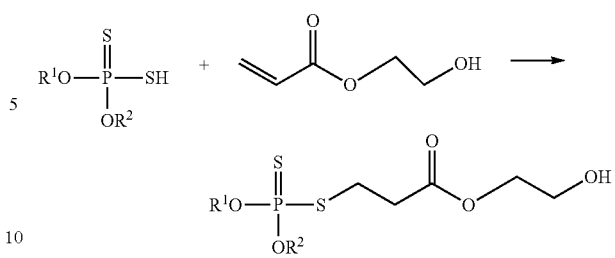

where, in this instance, 2-hydroxyethyl acrylate is illustrated, i.e., $R^3$ is H and $R^4$ is ethylene. The reaction may be effected by mixing and optionally heating the reactants at a somewhat elevated temperature, e.g., 40 to 80° C. The relative molar amounts of the dialkyldithiophosphate and the hydroxylalkyl (meth)acrylate as provided to the reaction may be about 1:1, such as 0.90:1 to 1.10:1 or 0.95:1 to 1.05:1 or 1.00:1 to 1.08:1. Any excess reactant may be removed after reaction, if desired or may remain in the reaction mixture.

The intermediate thus prepared is further reacted with a dialkylphosphite, where the alkyl groups may independently contain 1 to 12 carbon atoms. The alkyl groups may also be lower alkyl groups such as C1 to C6, or C1 to C4, or C1 to C3, or C1 or C2, such as methyl. A suitable reactant is dimethyl phosphite (also known as dimethyl hydrogen phosphite). Upon reaction, the resulting relatively volatile alkanol such as methanol may be removed by distillation or stripping:

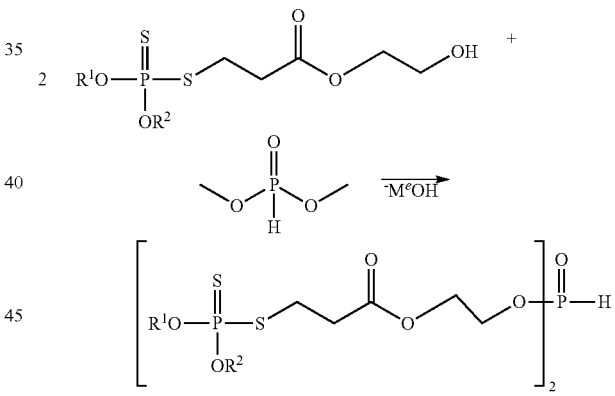

This subsequent reaction may by likewise conducted at somewhat elevated temperature of e.g., 80 to 110° C., depending on the volatility of the resulting alcohol to be removed and other factors which will be well known to those skilled in the art. The reaction may optionally be conducted in the presence of a small amount of base such as sodium methoxide. The relative molar amounts of the intermediate and the dialkylphosphite as provided to the reaction may be about 2:1, such as 1.90:1 to 2.10:1 or 1.95:1 to 2.05:1 or 1.96 to 2.00. If less than 2 moles of the intermediate are reacted with 1 mole of the dialkylphosphite, the resulting product mixture may contain a certain amount of material as in Formula I wherein n=1; in such cases, the relative mole ratios may be in the range of about 1:1 (such as 0.9:1 to 1.8:1 or 1.0:1 to 1.5:1) if it is desired that the mono-adduct be present in a larger or major amount. The relative molar amounts of the dialkyldithiophosphate, the hydroxyalkyl (meth)acrylate, and the dialkylphosphite may typically be about 2:2:1. It should be recognized that the above reaction scheme is somewhat idealized and the actual product mixture may be expected to contain other isomers, byproduct, and unreacted starting materials.

The first step of the reaction, to prepare the intermediate, and the second step, the reaction with the dialkylphosphite, may be conducted in the same vessel without isolating the intermediate, or, if desired, the intermediate may be isolated and subsequently reacted with the dialkylphosphite.

The product of the disclosed technology may be used as an additive in a lubricant composition. Its amount will typically be the amount suitable to provide antiwear performance to the lubricant. Such amounts may typically be 0.01 to 5 percent or, in other embodiments, 0.05 to 4 percent or 0.1 to 3 percent by weight.

One component which is used in certain embodiments of the disclosed technology is an oil of lubricating viscosity. Such oils include natural and synthetic oils, oil derived from hydrocracking, hydrogenation, and hydrofinishing, unrefined, refined, and re-refined oils and mixtures thereof.

Unrefined oils are those obtained directly from a natural or synthetic source generally without (or with little) further purification treatment.

Refined oils are similar to the unrefined oils except they have been further treated in one or more purification steps to improve one or more properties. Purification techniques are known in the art and include solvent extraction, secondary distillation, acid or base extraction, filtration, percolation and the like.

Re-refined oils are also known as reclaimed or reprocessed oils and are obtained by processes similar to those used to obtain refined oils and often are additionally processed by techniques directed to removal of spent additives and oil breakdown products.

Natural oils useful in making the inventive lubricants include animal oils, vegetable oils (e.g., castor oil), mineral lubricating oils such as liquid petroleum oils and solvent-treated or acid-treated mineral lubricating oils of the paraffinic, naphthenic or mixed paraffinic-naphthenic types and oils derived from coal or shale or mixtures thereof.

Synthetic lubricating oils are useful and include hydrocarbon oils such as polymerized and interpolymerized olefins (e.g., polybutylenes, polypropylenes, propylene-isobutylenecopolymers); poly(1-hexenes), poly(1-octenes), poly(1-decenes), and mixtures thereof; alkyl-benzenes (e.g., dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof.

Other synthetic lubricating oils include polyol esters (such as Priolube® 3970), diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

Oils of lubricating viscosity may also be defined as specified in the American Petroleum Institute (API) Base Oil Interchangeability Guidelines. The five base oil groups are as follows: Group I (sulfur content >0.03 wt %, and/or <90 wt % saturates, viscosity index 80-120); Group II (sulfur content ≤0.03 wt % and ≥90 wt % saturates, viscosity index 80-120); Group III (sulfur content ≤0.03 wt % and ≥90 wt % saturates, viscosity index ≥120); Group IV (all polyalphaolefins (PAOs)); and Group V (all others not included in Groups I, II, III, or IV). The oil of lubricating viscosity may also be an API Group II+ base oil, which term refers to a Group II base oil having a viscosity index greater than or equal to 110 and less than 120, as described in SAE publication "Design Practice: Passenger Car Automatic Transmissions", fourth Edition, AE-29, 2012, page 12-9, as well as in U.S. Pat. No. 8,216,448, column 1 line 57.

The oil of lubricating viscosity may be an API Group IV oil or mixtures thereof, i.e., a polyalphaolefin. The polyalphaolefin may be prepared by metallocene catalyzed processes or from a non-metallocene process.

The oil of lubricating viscosity comprises an API Group I, Group II, Group III, Group IV, Group V oil or mixtures thereof.

Often the oil of lubricating viscosity is an API Group I, Group II, Group II+, Group III, Group IV oil or mixtures thereof. Alternatively, the oil of lubricating viscosity is often an API Group II, Group II+, Group III or Group IV oil or mixtures thereof. Alternatively, the oil of lubricating viscosity is often an API Group II, Group II+, Group III oil or mixtures thereof.

The amount of the oil of lubricating viscosity present is typically the balance remaining after subtracting from 100 wt % the sum of the amount of the additive as described herein above, and the other performance additives. Suitable amounts may include 60 to 98 percent by weight, or 70 to 95, or 75 to 92, or 80 to 90 percent.

The lubricating composition may be in the form of a concentrate and/or a fully formulated lubricant. If the lubricating composition of the invention is in the form of a concentrate (which may be combined with additional oil to form, in whole or in part, a finished lubricant), the ratio of the of components of the invention to the oil of lubricating viscosity and/or to diluent oil include the ranges of 1:99 to 99:1 by weight, or 80:20 to 10:90 by weight.

Another component frequently used is a viscosity modifier. Viscosity modifiers (VM) and dispersant viscosity modifiers (DVM) are well known. Examples of VMs and DVMs may include polymethacrylates, polyacrylates, polyolefins, hydrogenated vinyl aromatic-diene copolymers (e.g., styrene-butadiene, styrene-isoprene), styrene-maleic ester copolymers, and similar polymeric substances including homopolymers, copolymers, and graft copolymers. The DVM may comprise a nitrogen-containing methacrylate polymer, for example, a nitrogen-containing methacrylate polymer derived from methyl methacrylate and dimethyl-aminopropyl amine.

Examples of commercially available VMs, DVMs and their chemical types may include the following: polyisobutylenes (such as Indopol™ from BP Amoco or Parapol™ from ExxonMobil); olefin copolymers (such as Lubrizol™ 7060, 7065, and 7067 from Lubrizol and Lucant™ HC-2000L and HC-600 from Lubrizol); hydrogenated styrene-diene copolymers (such as Shellvis™ 40 and 50, from Shell and LZ® 7308, and 7318 from Lubrizol); styrene/maleate copolymers, which are dispersant copolymers (such as LZ® 3702 and 3715 from Lubrizol); polymethacrylates, some of which have dispersant properties (such as those in the Viscoplex™ series from RohMax, the Hitec™ series of viscosity index improvers from Afton, and LZ® 7702, LZ® 7727, LZ® 7725 and LZ® 7720C from Lubrizol); olefin-graft-polymethacrylate polymers (such as Viscoplex™ 2-500 and 2-600 from RohMax); and hydrogenated polyisoprene star polymers (such as Shellvis™ 200 and 260, from Shell). Viscosity modifiers that may be used are described in U.S. Pat. Nos. 5,157,088, 5,256,752 and 5,395,539. The VMs and/or DVMs may be used in the functional fluid at a concentration of up to 20% by weight. Concentrations of 1 to 12%, or 3 to 10% by weight may be used.

The lubricant formulation may contain, in addition the phosphorus compound composition described above, one or more conventional phosphorus antiwear agents and/or extreme pressure agents. Alternatively, the lubricant formulation may be free from such conventional agents. The conventional phosphorus antiwear and/or extreme pressure agent may be present in an amount of 0 wt % to 10 wt %, 0 wt % to 8 wt %, 0 wt % to 6 wt %, 0.05 wt % to 2.5 wt %, 1 wt % to 2 wt %, and 0.05 wt % to 4 wt % of the lubricating composition. Suitable agents include those described in U.S. Pat. No. 3,197,405; see for instance examples 1 to 25 thereof.

The conventional phosphorus antiwear and/or extreme pressure agent may include a non-ionic phosphorus compound, an amine salt of a phosphorus compound other than those disclosed above (such as an amine salt of a mixture of monoalkyl and dialkyl phosphoric acid esters), an ammonium salt of a phosphorus compound other than those disclosed above, a metal dialkyldithiophosphate, a metal dialkylphosphate, or mixtures thereof. In one embodiment the conventional phosphorus antiwear or extreme pressure agent is selected from the group consisting of non-ionic phosphorus compound, a metal dialkyldithiophosphate, a metal dialkylphosphate, and mixtures thereof.

In one embodiment the conventional phosphorus antiwear and/or extreme pressure agent includes a metal dialkyldithiophosphate. The alkyl groups of the dialkyldithiophosphate may be linear or branched and may contain 2 to 20 carbon atoms, provided that the total number of carbons is sufficient to make the metal dialkyldithiophosphate oil soluble. The metal of the metal dialkyldithiophosphate typically includes monovalent or divalent metals. Examples of suitable metals include sodium, potassium, copper, calcium, magnesium, barium, or zinc. In one embodiment the phosphorus-containing acid, salt or ester is a zinc dialkyldithiophosphate. Examples of suitable zinc dialkylphosphates (often referred to as ZDDP, ZDP or ZDTP) include zinc di-(2-methylpropyl) dithiophosphate, zinc di-(amyl) dithiophosphate, zinc di-(1,3-dimethylbutyl) dithiophosphate, zinc di-(heptyl) dithiophosphate, zinc di-(octyl) dithiophosphate, zinc di-(2-ethylhexyl) dithiophosphate, zinc di-(nonyl) dithiophosphate, zinc di-(decyl) dithiophosphate, zinc di-(dodecyl) dithiophosphate, zinc di-(dodecylphenyl) dithiophosphate, zinc di-(heptylphenyl) dithiophosphate, and ZDDPs prepared from mixed alcohols such as methylpropyl and amyl alcohols, 2-ethylhexyl and isopropyl alcohols, or 4-methyl-2-pentyl and isopropyl alcohols; or mixtures thereof.

In one embodiment, the conventional phosphorus antiwear and/or extreme pressure agent includes a metal hydrocarbylphosphate or dihydrocarbylphosphate. The hydrocarbyl group of the metal dialkylphosphate includes a straight-chain or a branched alkyl group, a cyclic alkyl group, a straight-chain or a branched alkenyl group, an aryl group, or an arylalkyl group. In one embodiment the hydrocarbyl group of the metal dialkylphosphate is an oil soluble alkyl group. The alkyl group typically includes about 1 to about 40, or about 4 to about 40, or about 4 to about 20, or about 6 to about 16 carbon atoms. Examples of suitable hydrocarbyl or alkyl groups are listed in WO 2008/094759, paragraphs 0069 through 0076.

In one embodiment, the metal hydrocarbylphosphate or dihydrocarbylphosphate includes a metal salt of a mono-alkyl phosphate, and in another embodiment a metal salt of a di-alkyl phosphate. In one embodiment, the metal of the metal hydrocarbylphosphate or dihydrocarbylphosphate is a monovalent metal, in another embodiment the metal is divalent, and in another embodiment the metal is trivalent. The metal of the metal hydrocarbylphosphate or dihydrocarbylphosphate may include aluminum, calcium, magnesium, strontium, chromium, iron, cobalt, nickel, zinc, tin, manganese, silver, or mixtures thereof. In one embodiment, the metal is zinc.

In one embodiment, the lubricating composition further comprises an organo-sulfide. In one embodiment, the organo-sulfide comprises at least one of a polysulfide, thiadiazole compound, or mixtures thereof. In different embodiments, the organo-sulfide is present in a range of 0 wt % to 10 wt %, 0.01 wt % to 10 wt %, 0.1 wt % to 8 wt %, 0.25 wt % to 6 wt %, 2 wt % to 5 wt %, or 3 wt % to 5 wt % of the lubricating composition.

Examples of a thiadiazole include 2,5-dimercapto-1,3,4-thiadiazole, or oligomers thereof, a hydrocarbyl-substituted 2,5-dimercapto-1,3,4-thiadiazole, a hydrocarbylthio-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form oligomers of two or more of said thiadiazole units. Further examples of thiadiazole compounds are found in WO 2008/094759, paragraphs 0088 through 0090.

The organosulfide may alternatively be a polysulfide. In one embodiment, at least about 50 wt % of the polysulfide molecules are a mixture of tri- or tetra-sulfides. In other embodiments at least about 55 wt %, or at least about 60 wt % of the polysulfide molecules are a mixture of tri- or tetra-sulfides. The polysulfides include sulfurized organic polysulfides from oils, fatty acids or ester, olefins or polyolefins.

Oils which may be sulfurized include natural or synthetic oils such as mineral oils, lard oil, carboxylate esters derived from aliphatic alcohols and fatty acids or aliphatic carboxylic acids (e.g., myristyl oleate and oleyl oleate), and synthetic unsaturated esters or glycerides.

Fatty acids include those that contain 8 to 30, or 12 to 24 carbon atoms. Examples of fatty acids include oleic, linoleic, linolenic, and tall oil. Sulfurized fatty acid esters prepared from mixed unsaturated fatty acid esters such as are obtained from animal fats and vegetable oils, including tall oil, linseed oil, soybean oil, rapeseed oil, and fish oil.

The polysulfide may also be derived from an olefin derived from a wide range of alkenes, typically having one or more double bonds. The olefins in one embodiment contain 3 to 30 carbon atoms. In other embodiments, olefins contain 3 to 16, or 3 to 9 carbon atoms. In one embodiment the sulfurized olefin includes an olefin derived from propylene, isobutylene, pentene, or mixtures thereof. In one embodiment, the polysulfide comprises a polyolefin derived from polymerizing, by known techniques, an olefin as described above. In one embodiment, the polysulfide includes dibutyl tetrasulfide, sulfurized methyl ester of oleic acid, sulfurized alkylphenol, sulfurized dipentene, sulfurized dicyclopentadiene, sulfurized terpene, and sulfurized Diels-Alder adducts; phosphosulfurized hydrocarbons.

In one embodiment, the lubricating composition further comprises a friction modifier. In different embodiments, the friction modifier is present in an amount of 0 wt % to 7 wt %, 0.1 wt % to 6 wt %, 0.25 wt % to 5 wt %, or 0.5 wt % to 5 wt % of the lubricating composition.

The friction modifier includes fatty amines, borated glycerol esters, fatty acid amides, non-borated fatty epoxides, borated fatty epoxides, alkoxylated fatty amines, borated alkoxylated fatty amines, metal salts of fatty acids, fatty imidazolines, metal salts of alkyl salicylates (which may also be referred to as a detergent), metal salts of sulfonates (which may also be referred to as a detergent), condensation products of carboxylic acids or polyalkylene-polyamines, or amides of hydroxyalkyl compounds. In one embodiment, the friction modifier includes a fatty acid ester of glycerol. The fatty acids may contain 6 to 24, or 8 to 18 carbon atoms. In one embodiment, the friction modifier may comprise the product of isostearic acid with tetraethylenepentamine. A more detailed list of possible friction modifiers is found in WO 2008/094759, paragraphs 0100 through 0113.

The composition of the invention optionally further includes at least one other performance additive. The other performance additives include metal deactivators, detergents, dispersants, borated dispersants, antioxidants, corrosion inhibitors, foam inhibitors, demulsifiers, pour point depressants, seal swelling agents, and mixtures thereof. Foam inhibitors may be useful in that, in some embodiments, the phosphorus compounds of the present technology may tend to lead to enhanced foam formation, particularly when the phosphorus compounds are present in higher concentrations, such as 0.5 percent or greater, or 1.0 percent or greater, e.g., 1.1 to 3 percent by weight. In different embodiments, the total combined amount of the other performance additive compounds is present at 0 wt % to 25 wt %, about 0.1 wt % to 15 wt %, or 0.5 wt % to 10 wt %, of the lubricating composition. Although one or more of the other performance additives may be present, it is common for the other performance additives to be present in different amounts relative to each other.

Another component may be an antioxidant. Antioxidants encompass phenolic antioxidants, which may be hindered phenolic antioxidants, one or both ortho positions on a phenolic ring being occupied by bulky groups such as t-butyl. The para position may also be occupied by a hydrocarbyl group or a group bridging two aromatic rings. In certain embodiments the para position is occupied by an ester-containing group, such as, for example, an antioxidant of the formula

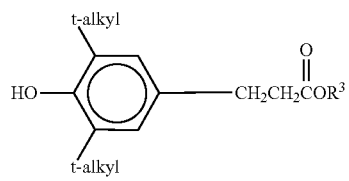

wherein $R^3$ is a hydrocarbyl group such as an alkyl group containing, e.g., 1 to 18 or 2 to 12 or 2 to 8 or 2 to 6 carbon atoms; and t-alkyl can be t-butyl. Such antioxidants are described in greater detail in U.S. Pat. No. 6,559,105.

Antioxidants also include aromatic amines. In one embodiment, an aromatic amine antioxidant can comprise an alkylated diphenylamine such as nonylated diphenylamine or a mixture of a di-nonylated and a mono-nonylated diphenylamine.

Antioxidants also include sulfurized olefins such as mono- or disulfides or mixtures thereof. These materials generally have sulfide linkages of 1 to 10 sulfur atoms, e.g., 1 to 4, or 1 or 2. Materials which can be sulfurized to form the sulfurized organic compositions of the present invention include oils, fatty acids and esters, olefins and polyolefins made thereof, terpenes, or Diels-Alder adducts. Details of methods of preparing some such sulfurized materials can be found in U.S. Pat. Nos. 3,471,404 and 4,191,659.

Molybdenum compounds can also serve as antioxidants, and these materials can also serve in various other functions, such as antiwear agents or friction modifiers. U.S. Pat. No. 4,285,822 discloses lubricating oil compositions containing a molybdenum- and sulfur-containing composition prepared by combining a polar solvent, an acidic molybdenum compound and an oil-soluble basic nitrogen compound to form a molybdenum-containing complex and contacting the complex with carbon disulfide to form the molybdenum- and sulfur-containing composition.

Typical amounts of antioxidants will, of course, depend on the specific antioxidant and its individual effectiveness, but illustrative total amounts can be 0.01 to 5 percent by weight or 0.15 to 4.5 percent or 0.2 to 4 percent. Detergents include neutral or overbased detergents, Newtonian or non-Newtonian, basic salts of alkali, alkaline earth or transition metals with one or more of a phenate, a sulfurized phenate, a sulfonate, a carboxylic acid, a phosphorus acid, a mono- and/or a di-thiophosphoric acid, a saligenin, an alkylsalicylate, and a salixarate.

Dispersants include N-substituted long chain alkenyl succinimides, as well as Mannich condensation products as well as post-treated versions thereof. Post-treated dispersants include those by reaction with urea, thiourea, dimercaptothiadiazoles, carbon disulfide, aldehydes, ketones, carboxylic acids, hydrocarbon-substituted succinic anhydrides, nitriles, epoxides, boron compounds, and phosphorus compounds. In one embodiment, the dispersant includes a borated polyisobutylene succinimide. Typically the number average molecular weight of the polyisobutylene ranges from about 450 to 5000, or 550 to 2500. In different embodiments, the dispersant is present in an amount of 0 wt % to 10 wt %, 0.01 wt % to 10 wt %, or 0.1 wt % to 5 wt % of the lubricating composition.

Corrosion inhibitors include octylamine octanoate, condensation products of dodecenyl succinic acid or anhydride, condensation products of a fatty acid such as oleic acid with a polyamine, or a thiadiazole compound described above. Metal deactivators include derivatives of benzotriazoles (typically tolyltriazole), 1,2,4-triazoles, benzimidazoles, 2-alkyldithiobenzimidazoles or 2-alkyldithiobenzothiazoles.

Foam inhibitors include copolymers of ethyl acrylate and 2-ethylhexyl acrylate and optionally vinyl acetate. Demulsifiers include trialkyl phosphates, polyethylene glycols, polyethylene oxides, polypropylene oxides, and (ethylene oxide-propylene oxide) polymers. Pour point depressants include esters of maleic anhydride-styrene, polymethacrylates, polyacrylates, or polyacrylamides. Seal swell agents include Exxon Necton-37™ (FN 1380) and Exxon Mineral Seal Oil (FN 3200).

The lubricant disclosed herein may be used in a method for lubricating a surface, comprising supplying thereto the lubricant described herein. The surface may be a part of a transmission, a clutch, a gear, a hydraulic system, a metalworking system, or an internal combustion engine. The surface may be part of a farm tractor or an off-highway vehicle or, alternatively, on-highway gear equipment. Each of such devices or systems may have individualized lubricant needs that may be met by the inclusion of one or more additives as will be apparent to those skilled in the art.

In one embodiment, the lubricating composition described herein may be a grease, and such compositions typically will further comprise a grease thickener. The grease thickener includes materials derived from (i) inorganic powders such as clay, organo-clays, bentonite, fumed silica, calcite, carbon black, pigments, copper phthalocyanine or mixtures thereof, (ii) a carboxylic acid and/or ester (such as a mono- or poly-carboxylic acid and/or ester thereof), (iii) a polyurea or diurea, or (iv) mixtures thereof. A detailed description of specific grease thickeners is found in WO 2008/094759, paragraphs 0135 through 0145. A grease composition may also contain one or more metal deactivators, antioxidants, antiwear agents, rust inhibitors, viscosity modifiers, extreme pressure agents (as described above) or a mixture of two or more thereof.

In one embodiment, the present technology provides a method of lubricating a driveline device (such as a gear, axle, or transmission) comprising supplying to the driveline device a lubricating composition disclosed herein. The driveline device may comprise at least one of a gear, a gearbox, an axle gear, a traction drive transmission, an automatic transmission or a manual transmission. In one embodiment the driveline device is a manual transmission or a gear, a gearbox, or an axle gear. The automatic transmission may be a continuously variable transmission (CVT), an infinitely variable transmission (IVT), a toroidal transmission, a continuously slipping torque converter clutch (CSTCC), a stepped automatic transmission, or a dual clutch transmission (DCT).

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, byproducts, derivatives, and other such materials which are normally understood to be present in the commercial grade.

As used herein, the term "condensation product" is intended to encompass esters, amides, imides and other such materials that may be prepared by a condensation reaction of an acid or a reactive equivalent of an acid (e.g., an acid halide, anhydride, or ester) with an alcohol or amine, irrespective of whether a condensation reaction is actually performed to lead directly to the product. Thus, for example, a particular ester may be prepared by a transesterification reaction rather than directly by a condensation reaction. The resulting product is still considered a condensation product.

The technology disclosed herein is useful for providing good antiwear performance to a lubricant composition, which may be better understood with reference to the following examples.

EXAMPLES

Example 1, part 1. To a 5-L four-necked round-bottom flask equipped with a nitrogen subsurface inlet tube, thermocouple, mechanical glass rod stirrer, and a Friedrichs cold water condenser connected to a 25% sodium hydroxide trap and bleach trap is added 2-hydroxyethyl acrylate (97% purity, 797 g, 6.65 mol) which is warmed to 40° C. To this is added O,O'-di(4-methyl-2-pentyl)dithiophosphoric acid (2500 g, 6.86 mol, based on total acid number by analysis) dropwise over 2 hours (can be 1-2.5 hours) using a pressure equalized addition funnel, with temperature being between 55° C.-65° C. After the addition is complete, the reaction temperature is set to 65° C. (can be 65-70° C.) and the reaction stirred at this temperature for 7 hours (can be 3-5 hours or until the hydroxyethyl acrylate is consumed). The resulting intermediate is allowed to cool to ambient temperature to give a liquid (3297 g) and stored under an inert atmosphere.

Example 1, part 2. To a 5-L four-necked round-bottom flask similarly equipped is added the intermediate from part 1 (2872 g, 8.00 moles, based on amount of available OH groups, by analysis). Anhydrous sodium methoxide (1 g, 18.5 mmol) is added in one portion and the reaction is allowed to stir for an additional 5 minutes. Dimethyl phosphite (449 g, 4.08 moles) is added in one portion and the reaction slowly heated to 95° C. while blowing nitrogen through the surface tube at about 28 L/hour (~1.0 sfch). The reaction mixture is held at 95° C. (may be 90-100° C.) for 8 hours with distillate being collected and removed via a Dean-Stark trap. The reaction mixture is stripped at 95° C. for 2 hours under reduced pressure (2.7 kPa, 20 mm Hg), providing additional distillate. 30 g of filter aid, dried overnight in an oven set at 90° C. is added to the flask and allowed to stir for an additional 15 minutes. 55 g of additional filter aid is used to pack a filter cake in a Buchner funnel under vacuum. The contents of the 5-L flask are then filtered through this cake and the resulting product is obtained as a pale yellowish brown clear liquid (2802 g).

Alternative method to Example 1, part 2 is as follows. To a 3-L four-necked round-bottom flask similarly equipped is added the intermediate from part 1 (1000 g, 2.05 moles, based on the molar amount of 2-hydroxyethyl acrylate). To this is added 1.5 wt % (can be 1-3 wt %) of a polyamide amine (Isostearic acid product with tetraethylenepentamine) and the reaction warmed to 60° C. Dimethyl phosphite (113 g, 1.02 moles) is added in one portion and the reaction slowly heated to 95° C. while blowing nitrogen through the surface tube at about 14 L/hour (~0.5 sfch). The reaction mixture is held at 95-100° C. for 8 hours with distillate being collected and removed via a Dean-Stark trap. The reaction mixture is stripped at 95° C. for 2 hours under reduced pressure (2.7 kPa, 20 mm Hg), providing additional distillate. 10 g of filter aid, dried overnight in an oven set at 90° C. is added to the flask and allowed to stir for an additional 15 minutes. 20 g of additional filter aid is used to pack a filter cake in a Buchner funnel under vacuum. The contents of the 3-L flask are then filtered through this cake and the resulting product is obtained as a pale yellowish brown/clear liquid (930 g).

Example 3, part 1. To a 5-L round-bottom flask containing 1824.0 g (4.38 moles) of O,O'-di-2-ethylhexyl dithiophosphate is added in one portion 541.0 g (4.52 moles, 1.03 molar equivalent) of 2-hydroxyethyl acrylate (97% pure) at ambient temperature. The reaction mixture is heated to 85° C. and then allowed to stir at this temperature for 4 hours while blowing nitrogen sub-surface. After four hours, the reaction is stopped and the resulting material is cooled and used in the next step without isolation.

Part 2. A 2-L round bottom flask equipped with a Dean-Stark adapter, nitrogen inlet and a water condenser is charged with the product of the previous step (1245.0 g). To this is added 145.5 g of dimethylphosphite in one portion at 25° C. The reaction mixture is heated to 125° C. for 4 hours during which time methanol is removed and collected in the Dean Stark adapter. After removing the theoretical amount of methanol, the heating is discontinued and the resulting product is collected (1310.0 g).

Examples 4, 5, and 6 (reference). The products of Examples 3 and 1, as well as a conventional phosphorous-containing composition, are separately added to a lubricant formulation characteristic of a farm tractor fluid. The formulation includes the following components (each presented on an oil-free basis):
Viscosity modifiers, 2.0%
Multifunctional succinimide dispersant, 0.42%
Antioxidants, 0.42%
Dibutyl phosphite 0.42%
Overbased calcium alkylbenzenesulfonate detergent, 0.36%
Zinc carboxylate friction modifier, 0.33%
Monoglyceride friction modifier, 0.25%
Boron-containing friction modifier, 0.2%
Tartrate ester friction modifier, 0.185%
Alkyl succinic esters/amides/imides, 0.28%
Fatty acid/polyamine condensate, 0.25%
Corrosion inhibitors, 0.25%
Sulfur-containing extreme pressure agent, 0.195%
Antifoam agents and other minor components, <0.05%
Mineral oils of lubricating viscosity, including diluent oils—balance to =100%

Amounts of certain of the phosphorus-containing materials are added to the above base formulation in amounts as shown in the following table:

|  | Example | | |
|---|---|---|---|
|  | 4 | 5 | 6 (reference) |
| product of: | Ex. 3 | Ex 1 | Complex mixture of mono- and diesters of phosphoric acid, C12-14 alkylamine salt (commercial material) |
| amount, % | 0.577 | 0.577 | 0.577 |

The formulated lubricants are subjected to a Low Speed FZG wear test. An FZG gear oil test machine is operated for 120 h at 9 rpm, first at 90° C. (0-40 hours) then raised to 120° C. (40-80 hours), then again 90° C. (80-120 hours). Test gears are weighed before and after each test segment, and weight loss reported to the nearest mg. The results are reported in the table below:

|  | Example | | |
|---|---|---|---|
| FZG wear, mg | 4 | 5 | 6 (reference) |
| 40 hour | 21 | 19 | 33 |
| 80 hour | 26 | 19 | 43 |
| 120 hour | 30 | 34 | 46 |

The results show that the materials of the disclosed technology provide good wear protection.

The materials of Examples 1, 2, and 3 contain a phosphite structure (as well as the dithiophosphate structures) due to the reaction in step 2 with dimethylphosphite. A material as in Examples 1 and 3 (as tested in Examples 4 and 5) is compared with a similar material with a phosphate structure, namely, tris(acryloyloxyethyl) phosphate. Two lubricant formulations are prepared: one containing the phosphite of the present invention (as from Example 1) and the second containing a comparable amount of tris(acryloyloxyethyl) phosphate, as show in the following Table:

| Component, % | Ex. 7 | Reference Ex. 8 |
|---|---|---|
| Phosphite as from Ex. 1 | 1.1 |  |
| Tris(acryloyloxyethyl) phosphate |  | 1.15 |
| Dispersant package | 0.87 | 0.87 |
| Overbased Ca sulfonate detergent | 0.32 | 0.32 |
| Sulfurized olefin | 0.2 | 0.2 |
| Corrosion, antifoam, emulsifier and antioxidant agents | 0.94 | 0.94 |
| Friction modifier package | 0.5 | 0.5 |
| Viscosity modifier package | 1.9 | 1.9 |
| Pour point depressant | 0.1 | 0.1 |
| Group II mineral oil + diluent oils | 94 | 94 |

The materials of Example 7 and Reference Example 8 are subjected to various tests. The Mercon V Falex EP Test is based on ASTM D3233. A rotating steel journal (290 rpm) is run between two stationary steel V-blocks immersed in test fluid. Load is applied to the V-blocks at 1334 N for 5 minutes and 2224 N for 2 minutes. Load is then applied in 1112 N increments for 1 minute duration of each stage until failure of the journal occurs. This is done in duplicate for two temperatures, 100° C. and 150° C., and separately run at two laboratories. Results are shown in the Table below. Higher values are better:

| Mercon V Falex | Ex. 7 | Ref. Ex. 8 |
|---|---|---|
| Laboratory 1: 100° C. | 340 kg (750 lb) | 227 kg (500 lb) |
| 150° C. | 370 kg (875 lb) | 181 kg (400 lb) |
| Laboratory 2: 100° C. | 624 kg (1373 lb) | 454 kg (998 lb) |
| 150° C. | 567 kg (1247 lb) | 454 kg (998 lb) |

The same lubricant formulations are subjected to a high frequency reciprocating rig (HFRR) test. The test uses a ball-on-disk configuration to measure wear, average friction coefficient and percent oil filming. 10 mL of sample is treated with 1% cumene hydroperoxide, and a 2 mL specimen is placed in the reservoir of the apparatus. A vibrator arm holding a non-rotating steel ball, loaded with 500 g, is contacted with a test disk submerged in the sample. Reciprocation is 1 mm, 20 Hz, for 75 minutes at 105° C. Results are shown in the following Table:

| HFRR | Ex. 7 | Ref. Ex. 8 |
|---|---|---|
| Film thickness | 73% | 66% |
| Friction coefficient | 0.176 | 0.173 |
| Wear scar, μm | 258 | 287 |

The same lubricant formulations are subjected to an FZG Tractor Test according to ASTM D4988-13. Weight loss from test gears and visual inspection are reported after the test. Results are shown in the following Table:

| FZG Tractor Test | Ex. 7 | Ref. Ex. 8 |
|---|---|---|
| Wear loss, g | 0.022 | 0.027 |
| Inspection results, pinion teeth and gear teeth | Trace wear | Trace wear |

The same lubricant formulations are subjected to the Low Speed FZG test as described above. The results are shown in the Table below:

| FZG wear, mg | Example | |
|---|---|---|
| | Ex. 7 | Ref. Ex. 8 |
| 40 hour | 17 | 10 |
| 80 hour | 33 | 31 |
| 120 hour | 39 | 46 |

The results show that the material of the disclosed technology exhibits improved performance compared with tris (acryloyloxyethyl) phosphate.

It is known that some of the materials described herein may interact in the final formulation, so that the components of the final formulation may be different from those that are initially added. For instance, metal ions (of, e.g., a detergent) can migrate to other acidic or anionic sites of other molecules, such as the product described above. The products formed thereby, including the products formed upon employing the composition of the present invention in its intended use, may not be susceptible of easy description. Nevertheless, all such modifications and reaction products are included within the scope of the present technology; the present technology encompasses the composition prepared by admixing the components described herein.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as optionally modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration. The expression "consisting of" or "consisting essentially of," when applied to an element of a claim, is intended to restrict all species of the type represented by that element, notwithstanding the presence of "comprising" elsewhere in the claim. In certain jurisdictions, recitation of one or more of narrower values for a numerical range or recitation of a narrower selection of elements from a broader list means that such recitations represent preferred embodiments.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A lubricant composition comprising:
an oil of lubricating viscosity;
a material represented by the formula

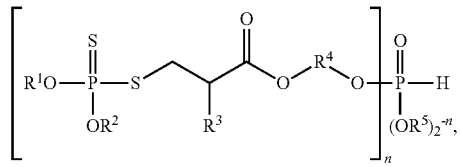

wherein $R^1$ and $R^2$ are each independently hydrocarbyl groups of 3 to about 12 carbon atoms, or are groups represented by

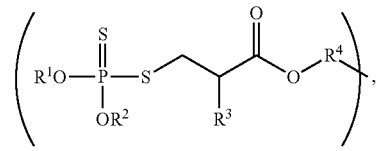

or wherein $R^1$ and $R^2$ together with the adjacent O and P atoms form a ring containing 2 to 6 carbon atoms; $R^3$ is hydrogen or a methyl group, $R^4$ is an alkylene group of 2 to 6 carbon atoms, $R^5$ is hydrogen or a hydrocarbyl group of 1 to about 12 carbon atoms, and n is 1 or 2; and
a metal dialkyldithiophosphate.

2. The lubricant composition of claim 1, wherein the material is represented by the formula

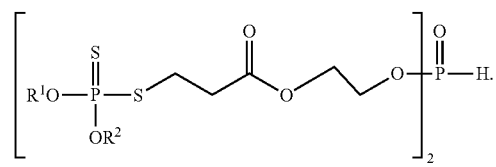

3. The lubricant composition of claim 1, wherein $R^1$ and $R^2$ are 2-ethylhexyl groups or 4-methyl-2-pentyl groups or mixtures thereof.

4. The lubricant composition of claim 1, wherein the metal dialkyldithiophosphate is zinc dialkyldithiophosphate (ZDDP).

5. The lubricant composition of claim 4, wherein the ZDDP is zinc di-(octyl) dithiophosphate.

6. The lubricant composition of claim 4, wherein the ZDDP is zinc di-(2-ethylhexyl) dithiophosphate.

7. The lubricant composition of claim 1, wherein the amount of the material in the lubricant composition is about 0.01 to about 5 percent by weight of the lubricant composition.

8. The lubricant composition of claim 1, wherein the metal dialkyldithiophosphate is present in the lubricant composition in an amount of from 0.05 to 2.5 weight percent of the lubricant composition.

9. A method for lubricating a surface, comprising supplying thereto the lubricant of claim 1.

10. The method of claim 9, wherein the surface is a part of a transmission, a clutch, a gear, a hydraulic system, a metal-working system, or an internal combustion engine.

11. The method of claim 9, wherein the surface is a part of a farm tractor or an off-highway vehicle.

\* \* \* \* \*